United States Patent [19]

Sefton et al.

[11] 4,272,490
[45] Jun. 9, 1981

[54] HYDROMETALLURGICAL PROCESS FOR THE TREATMENT OF ORES

[75] Inventors: Verner B. Sefton, Edmonton; Ian M. Masters, Fort Saskatchewan, both of Canada

[73] Assignee: Sherritt Gordon Mines Limited, Toronto, Canada

[21] Appl. No.: 920,027

[22] Filed: Jun. 28, 1978

[30] Foreign Application Priority Data

Jul. 5, 1977 [GB] United Kingdom ............... 28093/77

[51] Int. Cl.³ .................. B01D 11/00; B01F 1/00; C01G 43/00; C01G 56/00; C22B 11/00
[52] U.S. Cl. .................................. 423/18; 423/20
[58] Field of Search ................................ 423/18, 20

[56] References Cited

U.S. PATENT DOCUMENTS

| | | | |
|---|---|---|---|
| 2,826,481 | 3/1958 | Forward et al. | 423/18 |
| 3,920,788 | 11/1975 | Mercier et al. | 423/18 |
| 4,017,309 | 4/1977 | Johnson | 423/20 |
| 4,131,639 | 12/1978 | Mather | 423/18 |

*Primary Examiner*—Brooks H. Hunt
*Attorney, Agent, or Firm*—Robert F. Delbridge; Arne I. Fors

[57] ABSTRACT

A process for the recovery of uranium values from uranium-bearing material by sulphuric acid leaching when the material also contains siliceous matter which is at least partly soluble in sulphuric acid. The process comprises leaching the material with sulphuric acid in an aqueous slurry under oxidizing conditions at a temperature within the range of from about 65° C. to about 200° C. and at elevated pressure, with sulphuric acid being present in a quantity only slightly in excess of the amount required to dissolve the uranium and any other element whose dissolution is desired, to produce an insoluble residue containing siliceous matter and a leach solution containing dissolved values of uranium and any other desired element.

10 Claims, 1 Drawing Figure

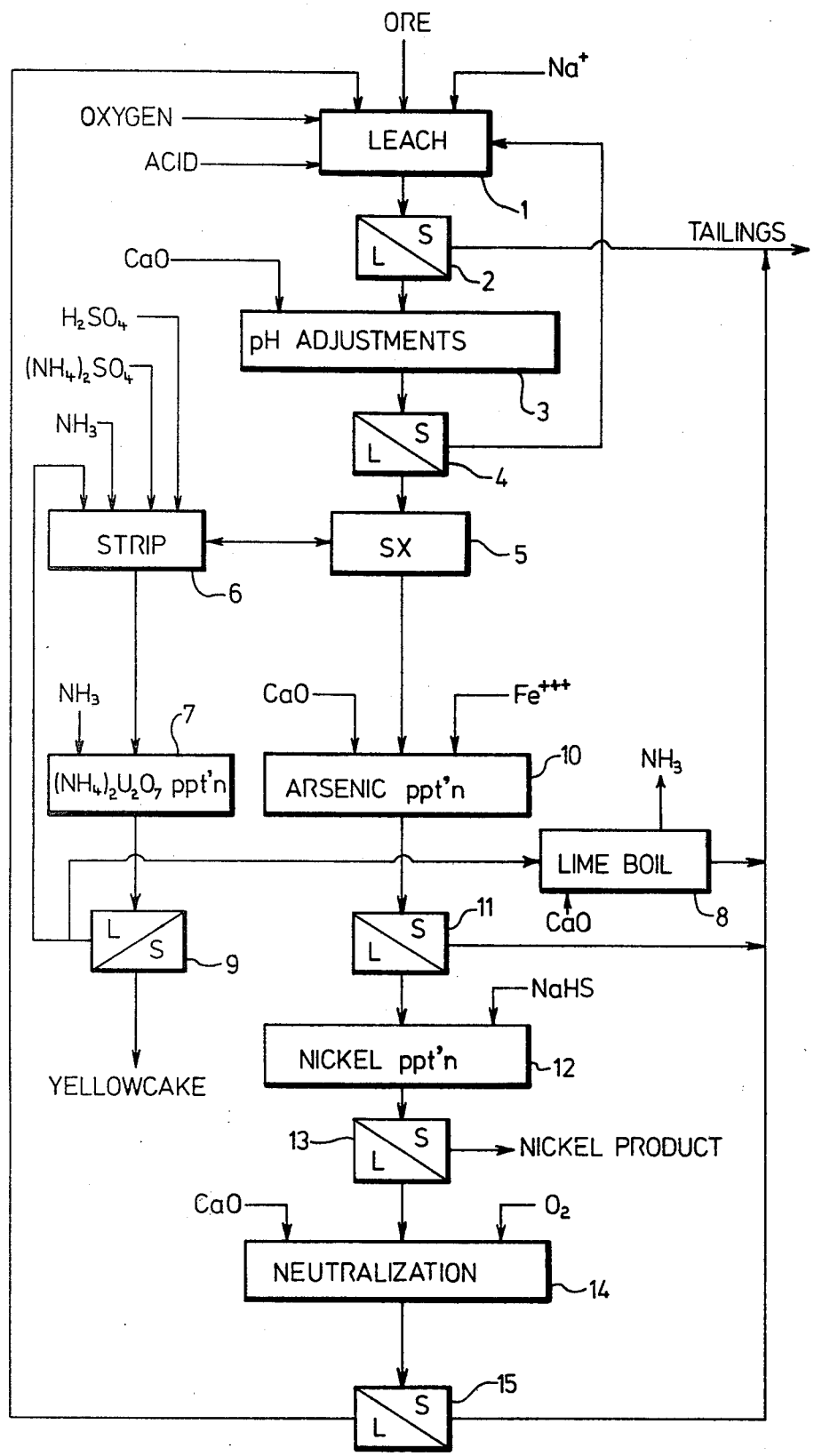

HYDROMETALLURGICAL PROCESS FOR THE TREATMENT OF ORES

This invention relates to the recovery of uranium values from uranium-bearing material.

Uranium values have of course been recovered from uranium bearing material for many years. However, considerable deposits of uranium bearing material have recently been discovered in which the material also contains a large amount of siliceous matter which is soluble in acid and further contains significant amounts of values of contaminating elements such as arsenic, iron and aluminum, which consume acid during acid leaching. Known uranium recovery processes including acid leaching are not particularly suitable for recovering uranium values from such material on a commercial scale.

One of the very significant problems facing the metallurgical industry, in addition to the economics of recovery processes, is the prevention of environmental pollution. Since uranium is a radioactive element, recovery of uranium values requires effective safety precautions to be taken in this respect. Among other things, this means that the recovery of uranium values should be virtually complete, so that an insignificant amount of uranium is left in tailings from a recovery process. Further, if uranium is to be recovered from material which also contains arsenic, it is not only necessary that the recovered uranium values be substantially free from contamination by arsenic, but also that the arsenic is removed in such a manner that it is not discharged in a harmful state to the environment, either to the atmosphere or as tailings from a uranium recovery process.

Known hydrometallurgical processes for the recovery of uranium are described for example in U.S. Pat. No. 2,797,977 (Forward et al) and U.S. Pat. No. 2,826,481 (Forward et al), which describe the leaching of uranium bearing material with sulphuric acid under oxidizing conditions, the sulphuric acid being added to the material or formed in situ when the material also contains sufficient sulphur for this purpose. However, although such prior art suggests various ways to remove certain contaminating elements, such as iron and aluminum, it does not deal with the problems involved when the starting material contains a large amount of acid soluble siliceous matter and possibly also contains a contaminating element such as arsenic.

It has been found that, if prior art techniques are applied to acid leaching of uranium bearing material containing a large amount of such siliceous matter, at least some of the siliceous matter becomes colloidal during the leaching step, possibly because of dissolution and reprecipitation of at least some of the siliceous matter. It is subsequently difficult to separate the solid residue from the leach solution because the colloidal siliceous matter in the leach solution imparts poor settling and filtration characteristics to substantially all the residue. With prior art techniques, this would entail a requirement for a large amount of washing of the leach slurry, with consequent excessive dilution of the leach solution, giving a much smaller concentration of dissolved uranium in the leach solution than would otherwise be the case. Further, an undesirably high amount of solubilized uranium would be lost in the leach residue, because of entrapment therein. In most cases, it is not possible to separate the siliceous matter from the remainder of the uranium bearing material before leaching because the uranium is usually intimately associated with the siliceous matter so that separation by techniques such as flotation would result in an excessive amount of uranium being separated with the siliceous matter from the remaining material.

Further, with prior art techniques, contaminating elements such as arsenic dissolve to an undesirable extent in the leaching step and are consequently present in the leach solution. Arsenic must therefore be removed from the leach solution in a purification step, from which arsenic is likely to be extracted in an environmental unacceptable form.

Since sulphuric acid is a commercially convenient leaching agent, it would therefore be advantageous if a process could be provided to utilize sulphuric acid as a leaching agent for uranium bearing material which contains acid soluble siliceous matter and possibly also values of contaminating elements such as arsenic, iron and aluminum, with the leach residue having good settling and filtration characteristics and with substantially all of any contaminating elements of the kind mentioned above reporting in the leach residue.

According to the present invention, it has been found that this can be achieved if an aqueous slurry of such uraniumbearing material is leached with sulphuric acid under oxidizing conditions at a temperature within the range of from about 65° C. to about 200° C. and preferably within the range of from about 125° C. to about 200° C., and at elevated pressure, with the quantity of acid being only slightly in excess of the amount required to dissolve the uranium. This process produces a leach residue in which the leach residue has acceptable settling and filtration characteristics, with the result that liquid/solids separation of the leached slurry can be carried out in an easier manner with smaller equipment than would be the case if prior art techniques were followed. Also, less solubilized uranium is entrapped in the leach residue.

Further, the present invention produces a leach solution containing dissolved uranium with a relatively small proportion of contaminating element values therein, and a leach residue containing a relatively high proportion of contaminating element values, with the result that purification procedures which would be necessary if prior art techniques were followed are simplified or eliminated.

The quantity of acid is calculated to include any sulphuric acid formed by oxidation of sulphur values in the uranium bearing material, although it is likely that uranium bearing material containing large amounts of siliceous matter will contain only small amounts of sulphur values relating to the acid requirement.

Another advantage of the present invention is that, not only does a substantial proportion of contaminating elements remain in the leach residue after the leach step but, during the leach step, certain of the contaminating elements, such as iron and aluminum, are first converted to sulphates and are then hydrolyzed to form insoluble compounds and sulphuric acid. Thus, at least some of the sulphuric acid initially consumed in reaction with the contaminating elements is regenerated. In the case of a contaminating element such as arsenic, it has been found that under the conditions of the leach step, the arsenic compound present may react with ferric sulphate produced during the leach step to form insoluble ferric arsenate and sulphuric acid. The ferric arsenate thus reports in the leach residue. In such a compound, the arsenic is relatively harmless since ferric arsenate is one of the more stable arsenic compounds. Also, further sulphuric acid is regenerated.

Uranium bearing siliceous material may also contain values of one or more other elements whose recovery is desirable. For example, such material is known which also contains significant amounts of nickel. Various nickel bearing materials can be leached with sulphuric acid, and it has been found that the present invention can be utilized to leach uranium and nickel bearing material to produce a leach solution containing dissolved uranium and dissolved nickel, while still obtaining the above mentioned advantages of the invention. In this case, the quantity of sulphuric acid is calculated to be only slightly in excess of the amount required to dissolve the nickel and uranium. The present invention also provides steps for separately recovering uranium and nickel from the leach solution as will be described later.

In the leach step of the present invention, oxygen gas may be conveniently used as oxidant with the gas being supplied as air, oxygen enriched air or substantially pure oxygen. It has been found that an oxygen partial pressure of a value in the range of from about 20 to about 200 psi is desirable. However, other oxidants, such as manganese dioxide, sodium hypochlorite or sodium chlorate may be used.

It has also been found that the siliceous material is in a better condition for separation from the leach slurry after the leaching step if, during the leaching step, the aqueous slurry is agitated at a minimum amount consistent with the maintenance of adequate oxidizing conditions throughout the slurry and adequate solids suspension during the leach.

In accordance with another feature of the invention, it has been found that the formation of insoluble compounds with certain contaminating elements during the leach step can be promoted by adding to the leach step ions of an element selected from the group consisting of sodium, potassium and ammonium. With sodium ions, for example, a jarosite compound may be formed with iron, and an alunite compound may be formed with aluminum. Also, it has been found that the addition of such ions can improve the settling and filtration characteristics of the leach slurry.

The ions of the element concerned may, for example, be added as sulphate or carbonate solution. A convenient additive is sodium sulphate, and preferably the concentration of the ions added is in the range of from about 0.2 to about 0.4 moles per mole of iron and aluminum.

As mentioned above, with the processing of uranium and nickel bearing material, the leach solution will contain dissolved uranium and dissolved nickel. After separation of the leach solution from the leach residue, the dissolved uranium can, in accordance with further features of the invention, be separated from dissolved nickel in commercially advantageous procedures.

The dissolved uranium can be selectively removed from the leach solution by ion exchange or solvent extraction techniques. Before such a uranium removal step, it may be necessary to adjust the pH of the leach solution to render it less acidic. This may be done for example by the addition of a neutralizing compound such as lime, limestone, magnesium oxide or sodium carbonate. Precipitate from this pH adjustment step may be recycled to the leach step.

Since most of any arsenic in the starting material will have been retained in the leach residue, it will probably not be necessary to carry out an arsenic removal step on the leach solution before the uranium removal step. The uranium removal step may be carried out in accordance with conventional ion exchange or solvent extraction steps.

After the uranium removal step, the dissolved nickel can then be recovered. However, before the actual nickel recovery step, it may be necessary to include an arsenic removal step to enable the nickel subsequently recovered to be sufficiently free from arsenic contamination. According to a further feature of the invention, this may be done by the addition of ferric ions to cause the precipitation of ferric arsenate which, as mentioned above, is a relatively harmless arsenic compound. The ferric arsenate precipitate can then be separated and discarded.

Before the nickel recovery step, it may also be necessary to carry out a further pH adjustment step to raise the pH and, as before, this can be done by addition of one of the compounds mentioned, such as lime. The arsenic removal step and the further pH adjustment step can be carried out at the same time, with only one subsequent liquid-solids separation step then being required to remove precipitated ferric arsenate and calcium sulphate.

Nickel values can then be precipitated from the leach solution in a conventional manner. For example, NaHS or $H_2S$ may be used for this purpose, with the precipitated nickel sulphide then being removed in a liquid-solids separation step for further treatment. Alternatively, nickel can be precipitated as nickel sulphate-ammonium sulphate double salt by addition of ammonium sulphate with subsequent cooling, or as elemental nickel by a cementation operation under acidic conditions with metallic iron.

The remaining barren solution may then be neutralized under oxidizing conditions, for example with lime and injection of oxygen, with the resultant precipitate being separated and discarded. The neutralized barren solution may be recycled to the leaching step since it contains only very small amounts of contaminating elements such as aluminum and iron, except of course if the above mentioned iron cementation step is utilized.

One embodiment of the present invention will now be described, by way of example, with reference to the accompanying drawing which shows a flow scheme for a uranium and nickel recovery process.

In this embodiment, the starting material is siliceous ore containing uranium and nickel values, with the uranium and nickel being intimately associated with the siliceous matter. Arsenic, iron, aluminum and magnesium are also present as contaminating elements, and the ore contains very little sulphur.

The ore is first ground to a suitable size, and is then repulped with dilute sulphuric acid to produce an aqueous slurry with a predetermined low acid concentration and a suitable pulp density. Sodium sulphate solution is added to the slurry to give a desired concentration of sodium ions in the slurry.

The slurry is then subjected to a leach step 1 in a pressure vessel at a temperature from about 150° to about 200° C., preferably from about 175° to about 200° C. in the presence of oxygen at a partial pressure of from about 20 to about 200 psi. The leach step is carried out until substantially all the uranium and nickel have dissolved. This will usually be between 1 and 6 hours.

In the leach step 1, most of the arsenic in the ore is first dissolved and then reprecipitated as ferric arsenate, most of the iron is first dissolved and then reprecipitated as jarosite and ferric arsenate, and most of the aluminum is first dissolved and then reprecipitated as sodium alunite, with the respective reprecipitations regenerating sulphuric acid.

After the leach step 1, the leach slurry is passed to a liquid-solids separation step 2 where the residue is separated from the leach solution. The leach slurry has good filtration characteristics so that the pregnant liquor produced in the separation step 2 is not unduly diluted by washing, and only a small amount of dissolved uranium and nickel is lost through entrainment in the separated residue. The uranium is present in the pregnant liquor as dissolved $U_3O_8$, and will usually be at a concentration of from about 1 to about 25 gpl $U_3O_8$. These factors facilitate the subsequent recovery of uranium of adequate purity from the pregnant liquor, as well as giving a good overall uranium extraction rate from the ore. The small quantity of uranium entrained in the residue, together with the presence of arsenic in the residue as relatively stable ferric arsenate, means that the residue can be discarded as tailings without undue risk to the environment.

The pregnant liquor from the separation step 2 is then subjected to a pH adjustment step 3. In this adjustment step, the pH of the pregnant liquor is raised to about 2 by addition of a neutralizing compound such as lime. Because of the small concentrations of arsenic, iron and aluminum ions in the pregnant liquor, there will be a relatively small amount of resultant precipitate, which results in relatively easy control of the pH adjustment step 3. The precipitate is separated from the adjusted pregnant liquor in a separation step 4, and the separated precipitate is recycled to the leach step 1. Since there is a relatively small quantity of precipitate, there will be a correspondingly small quantity of entrained $U_3O_8$ in the recycled precipitate.

The resultant pregnant liquor is then subjected to a uranium recovery step 5, where uranium is removed by solvent extraction. The aqueous pregnant liquor is contacted with an appropriate organic phase which is separated from the aqueous phase after an appropriate time. The loaded organic phase is then scrubbed with weak sulphuric acid solution, and stripped in a stripping step 6 with ammonium sulphate solution whose pH is adjusted to 3.8–4.5 during the stripping step with aqueous ammonia.

The aqueous strip solution is then subjected to a uranium precipitation step 7 in which the solution is heated to 60° C. and neutralized with aqueous ammonia to pH 7.5 to cause precipitation of $(NH_4)_2U_2O_7$ (yellow cake). The yellow cake is separated from the barren liquor in a liquid-solids separation step 9. Some of the barren liquor is then passed to a lime boil step 8 where the liquor is heated with lime to recover ammonia and with the remaining gypsum slurry being discarded as tailings. The remaining barren liquor is recycled to the strip stage 6.

The raffinate from the uranium removal step 5 contains dissolved nickel as well as small concentrations of dissolved contaminating elements. The raffinate is subjected to a combined pH adjustment and arsenic precipitation step 10 in which the pH is raised to 3.5–4.5 by the addition of lime, and ferric ions are added to precipitate residual arsenic as ferric arsenate. Precipitation of residual aluminum will also occur in this step. The precipitate is separated from the solution in a liquid-solids separation step 11 with the solids being discarded as tailings, and the solution proceeding to a nickel precipitation step 12.

In the nickel precipitation step 12, nickel is precipitated as nickel sulphide by addition of NaHS. The precipitated nickel sulphide is separated from the residual solution in a liquid-solids separation step 13, with the solids portion consequently being regarded as nickel product. The residual solution proceeds to a neutralization step 14, where the solution is treated with lime and oxygen. The concentration of aluminum and iron in the residual solution is very low, probably less than 0.1 gpl, and hence very little precipitate will be produced by these elements. When the origional ore contains magnesium, the presence of this element will result in a corresponding precipitate being formed.

The precipitate can readily be separated from the neutralized solution in a liquid/solids separation step 15, with the precipitate being discarded as tailings. The remaining solution can be recycled to the leach step 1, thereby minimizing the total water required for the process and also minimizing the discharge of water with possibly radionuclide contamination therefrom.

Various leach tests were carried out on an ore analyzing as follows:

| $U_3O_8$ | Ni | As | Fe | Al | Mg | $SiO_2$ | S | $CO_2$ |
|---|---|---|---|---|---|---|---|---|
| 3.1 | 2.1 | 1.2 | 2.0 | 7.4 | 3.2 | 57.0 | 1.0 | 2.0% |

In each test, a slurry of ore, water and required acid was charged into a high pressure 3.8 titanium autoclave with an agitator having two impellers on a single shaft. Before charging into the autoclave, the ore had been ground to a size 95%-200 mesh. The solids content of the slurry was 500 gpl, or in other words, the slurry was 33% solids. After sealing the autoclave, agitation was started and the contents heated. When the slurry reached the required temperature, the oxygen overpressure was adjusted to the required level. At various predetermined time intervals, 150 ml samples were taken from the autoclave, using a sampling bomb, and the composition of the solution and residue was analyzed. Further descriptions and results of the tests are as follows:

EXAMPLE 1

Tests were carried out to determine the effect of temperature variation on the leach step. In each test, the acid concentration was 175 gpl, with acid consequently being present at a high level of 350 q/kg ore. One set of tests was carried out with high agitation, namely with a shaft speed of 825 rpm which have a blade tip speed of 3.71 m/sec; and another set of tests was carried out with low agitation, namely with a shaft speed of 215 rpm, which gave a blade tip speed of 0.97 m/sec. The results of these tests are shown in Table I.

TABLE I

| Variable Conditions | | | | Solution Analysis (gpl) | | | | | | | | |
|---|---|---|---|---|---|---|---|---|---|---|---|---|
| Temp (°C.) | Oxygen (psi) | Agitation shaft (rpm) | Time (h) | Ni | $U_3O_8$ | As | $Fe_T$ | $Fe^{++}$ | $H_3SO_4$ | Al | Mg | $SiO_3$ |
| Variable | | | | | | | | | | | | |

TABLE I-continued

| Temp (°C.) | Oxygen (psi) | Agitation shaft(rpm) | Time (h) | | | | | | | | | |
|---|---|---|---|---|---|---|---|---|---|---|---|---|
| *Temperature at 825 rpm* | | | | | | | | | | | | |
| 80 | 50 | 825 | 1 | | | 4.2 | 5.5 | | 117.5 | | | |
| | | | 2 | | | 4.7 | 6.0 | | 98.8 | | | |
| | | | 4 | | | 5.2 | 6.4 | | 74.5 | | | |
| | | | 6 | | | 5.8 | 6.8 | | 61.5 | | | 0.80 |
| | | | 12 | 8.0 | 16.5 | 6.1 | 7.7 | 1.1 | 42.0 | 13.6 | 7.60 | 0.31 |
| 125 | 50 | 825 | 1 | | | 5.8 | 7.2 | | 41.5 | | | |
| | | | 2 | | | 6.0 | 7.4 | | 41.1 | | | |
| | | | 4 | | | 6.0 | 7.4 | | 35.4 | | | 0.23 |
| | | | 6 | 8.8 | 17.9 | 6.3 | 7.5 | 0.2 | 35.9 | 17.4 | 9.25 | |
| 175 | 100 | 825 | 1 | | | 4.8 | 5.7 | | 41.5 | | | |
| | | | 2 | | | 5.7 | 5.7 | | 37.5 | | | |
| | | | 4 | | | 3.3 | 3.8 | | 35.8 | | | 0.17 |
| | | | 6 | 10.6 | 16.7 | 2.1 | 3.2 | 0.05 | 34.0 | 15.2 | 9.05 | |
| *Variable Temperature at 215 rpm* | | | | | | | | | | | | |
| 80 | 200 | 215 | 6 | | | 6.0 | 6.5 | | 71.5 | | | 1.33 |
| | | | 12 | 9.8 | | 6.8 | 7.8 | | 58.5 | 13.0 | 7.5 | 0.92 |
| 175 | 150 | 215 | 2 | | | 6.7 | 7.1 | | 40.8 | | | |
| | | | 4 | | | 7.0 | 7.6 | | 40.3 | | | 0.37 |
| | | | 6 | 11.1 | 17.1 | 5.9 | 6.2 | 0.04 | 34 | 16.8 | 9.85 | |

| Variable Conditions | | | | Residue Analysis (%) | | | Extractions (%) | | Slurry Filtration (min) | |
|---|---|---|---|---|---|---|---|---|---|---|
| Temp (°C.) | Oxygen (psi) | Agitation shaft(rpm) | Time (h) | Ni | $U_3O_8$ | As | $U_3O_8$ | Ni | No flocculant | With flocculant |
| *Variable Temperature at 825 rpm* | | | | | (ppm) | | | | | |
| 80 | 50 | 825 | 1 | 1.21 | 121 | | 99.6 | 42.9 | | |
| | -- | | 2 | 1.06 | 41 | | 99.9 | 50.0 | | |
| | | | 4 | 0.905 | 41 | | 99.9 | 57.3 | | |
| | | | 6 | 0.786 | 38 | | 99.9 | 62.9 | | |
| | | | 12 | 0.669 | 50 | | 99.7 | 68.4 | 90 | |
| 125 | 50 | 825 | 1 | 0.816 | 75 | | 99.8 | 61.5 | | |
| | | | 2 | 0.779 | 41 | | 99.9 | 63.3 | | |
| | | | 4 | 0.526 | 38 | | 99.9 | 75.2 | | |
| | | | 6 | 0.470 | 25 | | 99.9 | 77.8 | >120 | |
| 175 | 100 | 825 | 1 | 0.219 | 49 | | 99.8 | 89.7 | | |
| | | | 2 | 0.073 | 42 | | 99.9 | 96.6 | | |
| | | | 4 | 0.067 | 55 | | 99.8 | 96.8 | | |
| | | | 6 | 0.064 | 41 | | 99.9 | 97.0 | 66 | 51-58 |
| *Variable Temperature at 215 rpm* | | | | | | | | | | |
| 80 | 200 | 215 | 6 | 0.641 | 79 | | 99.7 | 69.8 | 20 | |
| | | | 12 | 0.496 | 75 | | 99.8 | 76.6 | 24 | 16 |
| 175 | 150 | 215 | 2 | 0.389 | 94 | | 99.7 | 81.7 | | |
| | | | 4 | 0.069 | 54 | | 99.8 | 96.7 | | |
| | | | 6 | 0.055 | 41 | 0.17 | 99.9 | 97.4 | 10 | |

With regard to the last column of Table I headed Slurry Filtration, the figures given represent the time for 200 ml of slurry at 60° C. to dewater on a Buchner filter funnel of 12 cm diameter. The flocculants used were Jaguar MDD in the first case and Percol 728 in the second case, both of these substances being added at the dosage rate of 0.13 lb/ton.

It will be seen that over the temperature range 80° C. to 175° C. uranium extraction was rapid, with greater than 99.6% extraction being obtained for a one hour retention time. Extractions of 99.9%, corresponding to less than 50 ppm $U_3O_8$ in the leach residue were obtained after two hours. Reducing the rate of agitation had no substantial effect on uranium extraction. The rate and extent of nickel extraction was much more sensitive to leach temperature. Nickel extractions exceeding 90% were obtained only in the 175° C. leaches. Reducing the rate of agitation from 825 to 215 rpm at 175° C. reduced the nickel extraction from 96.6% to 81.7% after 2 hours retention time. However, extractions after 4 and 6 hours were identical at 96.7%.

Arsenic concentrations in pregnant solutions ranged from 2.1 to 7.0 gpl. The lowest concentrations were found after longer retention times in the high agitation 175° C. leach. The reduction in arsenic concentrations coincided with reductions in iron concentrations, suggesting that ferric arsenate precipitation occurred.

The most important feature of the results in Table I was the discovery that reducing agitation greatly improved the filtration rates of the product slurries. For example, the product slurry produced at 175° C. and 215 rpm showed a six-fold improvement in filtration rates over the slurry from the 825 rpm leach.

EXAMPLE 2

Tests were then carried out to determine the effect of reduced acid addition at different leach temperatures, and in view of the results shown in Example 1, these tests were carried out at the lower agitation rate. The results are shown in the upper part of Table II.

TABLE II

| Variable Leach Conditions | | | | | | Solution Analysis (gpl) |
|---|---|---|---|---|---|---|
| Temp | Oxygen | Agitation | Acid Addition | $Na_3SO_4$ | Time | |

TABLE II-continued

| (°C.) | (psi) | (rpm) | (gpl) | (kg/tonne) | (gpl) | h | Ni | U$_3$O$_8$ | As | Fe$_T$ | Fe$^{++}$ | H$_3$SO$_4$ | Al | Mg | SiO$_2$ |
|---|---|---|---|---|---|---|---|---|---|---|---|---|---|---|---|
| Reduced Acid Addition: Effect of Temperature | | | | | | | | | | | | | | | |
| 80 | 200 | 215 | 100 | 200 | — | 2 | | | 5.6 | 5.2 | | 31.3 | | | |
| | | | | | | 4 | | | 6.2 | 5.5 | | 42.3 | | | |
| | | | | | | 6 | | | 6.2 | 5.8 | | 34.5 | | | 2.7 |
| | | | | | | 10 | 10.9 | 19.8 | 5.3 | 5.4 | | 29.3 | 8.4 | 5.3 | 1.4 |
| 175 | 150 | 215 | 100 | 200 | — | 2 | | | 1.5 | 2.6 | | 33.1 | | | |
| | | | | | | 4 | | | 0.93 | 1.7 | | 30.3 | | | |
| | | | | | | 6 | 14.7 | | 0.97 | 1.2 | | 30.3 | 8.3 | 8.8 | 0.22 |
| 200 | 150 | 215 | 100 | 200 | — | 2 | | | 3.5 | 6.97 | | 32.0 | | | |
| | | | | | | 4 | | | 1.3 | 2.94 | | 31.1 | | | |
| | | | | | | 6 | 10.0 | 16.4 | 0.38 | 0.80 | | 28.7 | 1.65 | 5.4 | 0.47 |
| Effect of Sodium Sulphate Addition (175° C.) | | | | | | | | | | | | | | | |
| 175 | 150 | 215 | 100 | 200 | 18.5 | 2 | | | 4.9 | 0.42 | | 41.0 | | | |
| | | | | | | 4 | | | 2.4 | 0.07 | | 43.0 | | | |
| | | | | | | 6 | 13.3 | 25.6 | 2.0 | 0.09 | 0.048 | 25.8 | 0.70 | 10.2 | 0.92 |
| 175 | 150 | 215 | 50 | 100 | 18.5 | 2 | | | 0.44 | 0.04 | | 16.6 | | | |
| | | | | | | 4 | | | 0.40 | 0.03 | | 15.6 | | | |
| | | | | | | 6 | 9.9 | 18.8 | 0.44 | 0.03 | 0.03 | 15.3 | 0.32 | 3.6 | 1.2 |
| Effect of Sodium Sulphate Addition (200° C.) | | | | | | | | | | | | | | | |
| 200 | 150 | 215 | 75 | 150 | 18.5 | 2 | | | 2.2 | 0.07 | | 25.3 | | | |
| | | | | | | 4 | | | 1.4 | 0.01 | | 18.6 | | | |
| | | | | | | 6 | 9.7 | 16.6 | 1.4 | 0.04 | | 18.3 | 0.29 | 5.9 | 0.57 |

| Variable Leach Conditions | | | | | | Residue Analysis | | | Extractions | | Slurry Filtration (Min) | |
|---|---|---|---|---|---|---|---|---|---|---|---|---|
| Temp | Oxygen | Agitation | Acid Addition | | Na$_3$SO$_4$ | Time | (%) | | | (%) | No | With |
| (°C.) | (psi) | (rpm) | (gpl) | (kg/tonne) | (gpl) | h | Ni | U$_3$O$_8$ | As | U$_3$O$_8$ | Ni | flocculant |
| Reduced Acid Addition: Effect of Temperature | | | | | | | | | (ppm) | | | |
| 80 | 200 | 215 | 100 | 200 | — | 2 | 0.839 | 396 | | 98.7 | 60.4 | |
| | | | | | | 4 | 0.704 | 117 | | 99.6 | 66.8 | |
| | | | | | | 6 | 0.808 | 50 | | 99.8 | 71.3 | |
| | | | | | | 10 | 0.528 | 90 | | 99.7 | 75.1 | 17 | 8.5 |
| 175 | 150 | 215 | 100 | 200 | — | 2 | 0.215 | 390 | | 98.7 | 89.9 | |
| | | | | | | 4 | 0.103 | 78 | | 99.7 | 95.1 | 12 | 8.5 |
| | | | | | | 6 | 0.091 | 46 | | 99.9 | 95.7 | |
| 200 | 150 | 215 | 100 | 200 | — | 2 | 0.521 | 271 | | 99.1 | 75.4 | |
| | | | | | | 4 | 0.175 | 156 | | 99.5 | 91.7 | |
| | | | | | | 6 | 0.181 | 205 | | 99.3 | 91.5 | 5.8 | 4.0 |
| Effect of Sodium Sulphate Addition (175° C.) | | | | | | | | | | | | |
| 175 | 150 | 215 | 100 | 200 | 18.5 | 2 | 0.294 | 262 | | 99.2 | 86.1 | |
| | | | | | | 4 | 0.089 | 175 | | 99.4 | 95.8 | |
| | | | | | | 6 | 0.098 | 330 | | 98.9 | 95.4 | 4.8 | |
| 175 | 150 | 215 | 50 | 100 | 18.5 | 2 | 0.209 | 298 | | 99.0 | 90.1 | |
| | | | | | | 4 | 0.195 | 284 | | 99.1 | 90.8 | |
| | | | | | | 6 | 0.194 | 238 | | 99.2 | 90.8 | 5.5 | 3.3 |
| Effect of Sodium Sulphate Addition (200° C.) | | | | | | | | | | | | |
| 200 | 150 | 215 | 75 | 150 | 18.5 | 2 | 0.263 | 242 | | 99.2 | 87.6 | |
| | | | | | | 4 | 0.267 | 90 | | 99.7 | 87.4 | |
| | | | | | | 6 | 0.285 | 86 | | 99.7 | 86.6 | 2.5 | 1.8 |

The flocculant in this case was Percol 728 or Percol 352, added at dosage rates up to 0.5 lb/ton.

It will be seen that the level of acid addition had a marked effect on the concentrations of iron and arsenic in the product solutions. The 175° C. leach with 200 g H$_2$SO$_4$/kg ore gave 4 and 6 hour filtrates containing 1 gpl As and 1-2 gpl Fe, while the 175° C. leach with 350 g H$_2$SO$_4$/kg ore gave 4 and 6 hour filtrates containing 6-7 gpl As and 6-7 gpl Fe.

Comparison of the As and Fe concentrations in the solutions from the low acid runs indicated a marked effect of temperature. Throughout the 80° C. leach and in the early stages (2 h) of the 200° C. leach, there were higher As and Fe concentrations than in the 175° C. leach. Both the 175° C. leach and the 200° C. leach after 2 h showed significant precipitation of As and Fe from solution, presumably as FeAsO$_4$.

Aluminum and magnesium concentrations in the product solutions from the lower acid addition tests were significantly lower than found in the higher acid tests, indicating reduced attack on the gangue components. The results for the low acid leach at 200° C. showed particularly low aluminum concentration, 1.65 gpl aluminum, suggesting precipitation of basic aluminum sulphate during the leach.

EXAMPLE 3

The next tests were carried out to determine the effect of the addition of sodium ions to the leach slurry, the sodium ions being added as Na$_2$SO$_4$ as an amount to give 6 gpl Na$^-$ solution. The results are shown in the lower part of Table II.

These tests show several important results. Iron and aluminum concentrations in the product solutions were significantly lower than in the previous tests. In the 100 g H$_2$SO$_4$/kg ore run, the arsenic contamination was also significantly lower. After 2 hours retention time, the leach solution contained only 0.44 gpl As and 0.04 gpl Fe. The magnesium concentration was also drastically reduced. Aluminum concentrations were less than 1 gpl in all of the sodium sulphate addition runs, confirming the precipitation of sodium alunite during the leach. Also, filtration rates for the sodium sulphate addition runs were better than found for any previous runs. It is also interesting to note that with lower acid, i.e. with lower free acid, good uranium and nickel extractions are obtained.

The above examples clearly demonstrate the advantages obtained by the present invention.

What we claim as new and desire to protect by Letters Patent of the United States is:

1. A process for the recovery of uranium values from uranium-bearing material by sulphuric acid leaching when the material also contains siliceous matter which is at least partly soluble in sulphuric acid, iron and arsenic, said process comprising leaching said material with sulphuric acid in an aqueous slurry under oxidizing conditions at a temperature within the range of from about 65° C. to about 200° C. and at elevated pressure, said sulphuric acid being present in a quantity slightly in excess of the amount required to dissolve the uranium and any other element whose dissolution is desired to produce an insoluble residue containing siliceous matter and ferric arsenate, and a leach solution containing dissolved values by uranium and said any other element.

2. A process according to claim 1 wherein the material is leached at a temperature in the range of from about 125° C. to about 200° C.

3. A process according to claim 1 wherein the material also contains nickel, and the leach solution also contains dissolved nickel values, with said sulphuric acid being present during leaching in a quantity slightly in excess of the amount required to dissolve the uranium and the nickel.

4. A process according to claim 1 wherein said oxidizing conditions are provided by oxygen at a partial pressure in the range of from about 20 psi to about 200 psi.

5. A process according to claim 1 wherein, during leaching, the aqueous slurry is agitated at a minimum amount consistent with the maintenance of adequate oxidizing conditions throughout the slurry and the maintenance of adequate suspension of solids in the slurry.

6. A process according to claim 1 wherein cations selected from the group consisting of sodium, potassium and ammonium are present during the leach to cause the formation of an insoluble jarosite compound with iron.

7. A process according to claim 8 wherein sodium ions are added as sodium sulphate to provide a concentration in the range of from about 0.2 to about 0.4 moles per mole of iron.

8. A process according to claim 1 wherein the material also contains aluminum, and cations selected from the group consisting of sodium, potassium and ammonium are present during the leach to cause the formation of an insoluble alunite compound with the aluminum.

9. A process according to claim 6 wherein sodium ions are added as sodium sulphate to provide a concentration in the range of from about 0.2 to about 0.4 moles per mole of aluminum.

10. A process according to claim 3 wherein uranium values are removed from the dissolved uranium and nickel containing leach solution, and the remaining nickel containing solution is treated with ferric ions to remove arsenic in said solution as ferric arsenate before recovery of nickel values from said solution.

* * * * *

UNITED STATES PATENT AND TRADEMARK OFFICE
CERTIFICATE OF CORRECTION

PATENT NO. : 4,272,490
DATED : June 9, 1981
INVENTOR(S) : Verner B. Sefton and Ian M. Masters It is certified that error appears in the above-identified patent and that said Letters Patent are hereby corrected as shown below:

Column 11 line 21 cancel "by" and insert "of"

Signed and Sealed this

Twenty-sixth Day of January 1982

[SEAL]

Attest:

GERALD J. MOSSINGHOFF

Attesting Officer

Commissioner of Patents and Trademarks